Jan. 11, 1927.
S. E. TRAVIS, JR
1,614,412
TRUCK BODY
Filed March 17, 1926    3 Sheets-Sheet 1
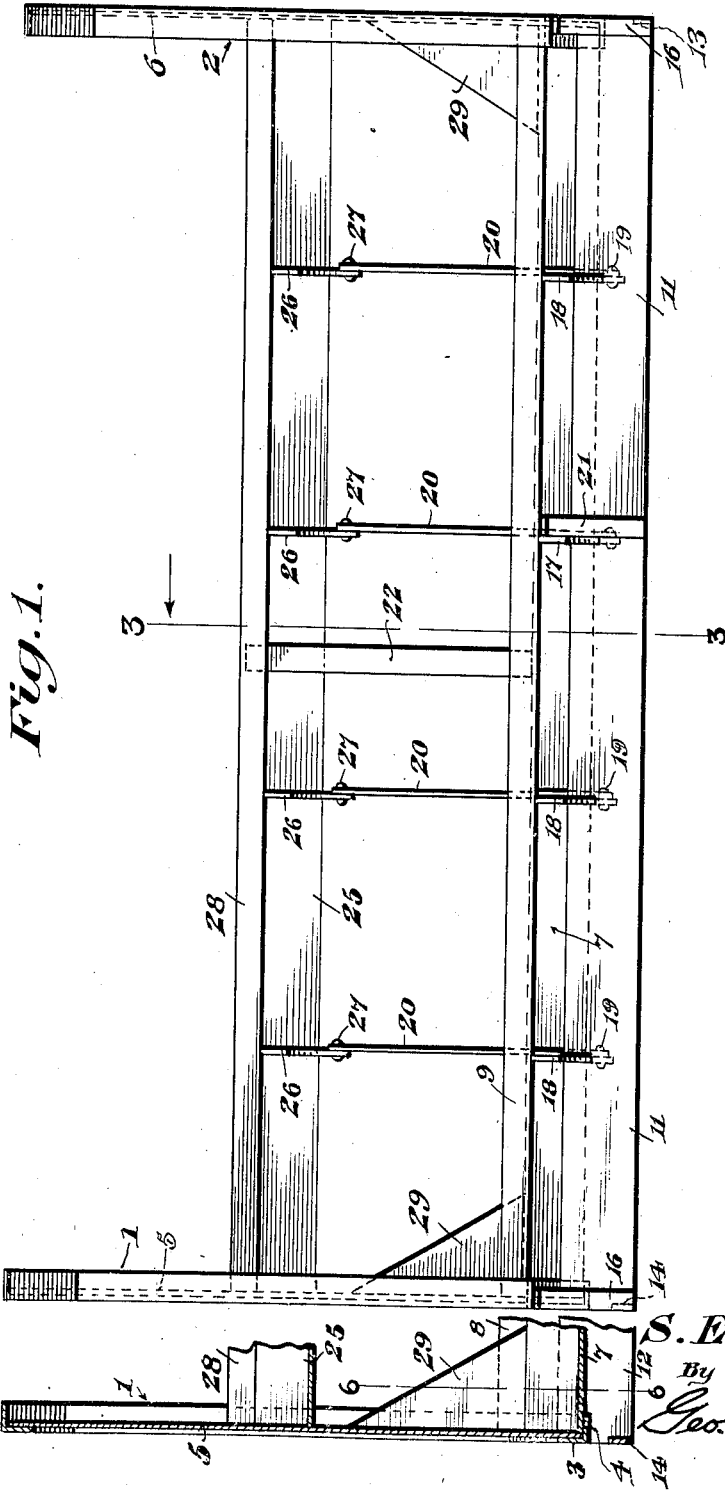
INVENTOR.
S. E. Travis Jr.,
By
Geo. P. Kimmel.
ATTORNEY.

Jan. 11, 1927.
S. E. TRAVIS, JR
1,614,412
TRUCK BODY
Filed March 17, 1926  3 Sheets-Sheet 2
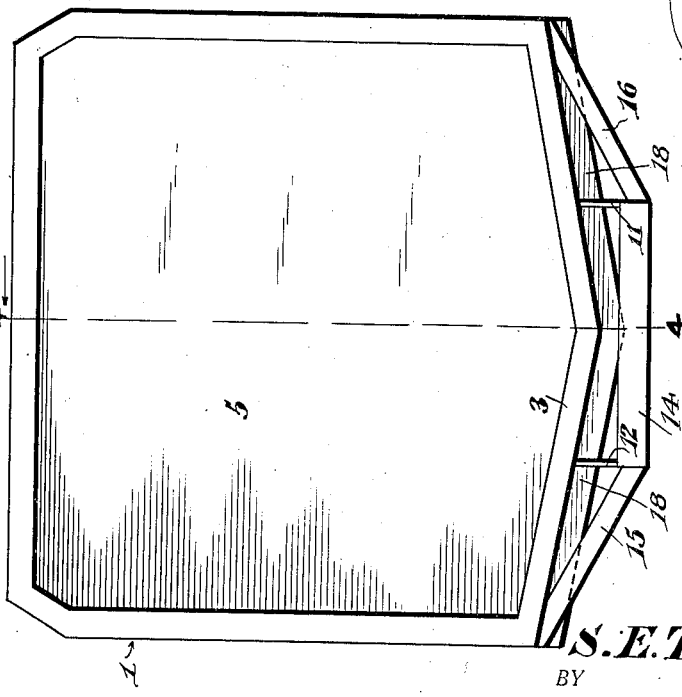
INVENTOR.
S. E. Travis Jr.,
BY
Geo. F. Kimmel  ATTORNEY.

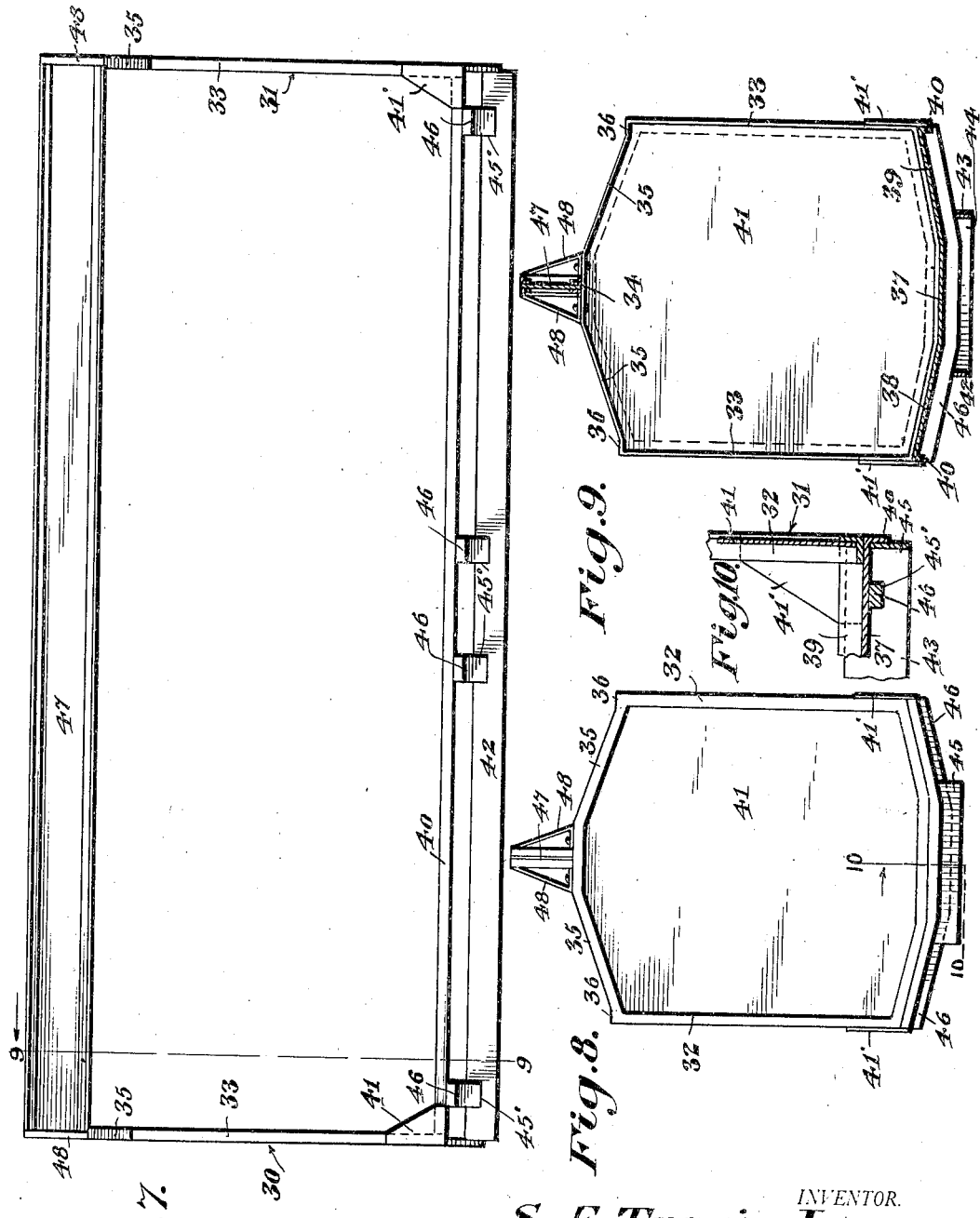

Patented Jan. 11, 1927.

1,614,412

UNITED STATES PATENT OFFICE.

SIMEON E. TRAVIS, JR., OF HATTIESBURG, MISSISSIPPI.

TRUCK BODY.

Application filed March 17, 1926. Serial No. 95,330.

This invention relates to a truck body, designed primarily for the handling of crated, cased or boxed bottled goods, but it is to be understood that a truck body, in accordance with this invention, can be employed for the handling of any character of truckage for which it is found applicable, and the invention has for its object to provide, in a manner as hereinafter set forth, a truck body constructed and arranged whereby the load will at all times tend to be stationary and further reducing side slippage thereof to a minimum.

A further object of the invention is to provide, in a manner as hereinafter set forth, a truck body that can be easily loaded and unloaded and which will carry its load to the best advantage under all road conditions.

Further objects of the invention are to provide, in a manner as hereinafter set forth, a truck body designed to be attached to any form of truck, which is simple in its construction and arrangement, strong, durable, compact, thoroughly efficient when used, readily installed with respect to a truck, of minimum weight, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation of a truck body of the shelf type in accordance with this invention.

Figure 2 is an end view thereof.

Figure 3 is a section on line 3—3 Figure 1.

Figure 4 is a fragmentary view in longitudinal section on line 4—4 Figure 2.

Figure 5 is a fragmentary view in longitudinal section on line 5—5 Figure 3.

Figure 6 is a fragmentary view in transverse section on line 6—6 Figure 4.

Figure 7 is a side elevation of a modified form of truck body, in accordance with this invention.

Figure 8 is an end view thereof.

Figure 9 is a section on line 9—9 Figure 7.

Figure 10 is a section on line 10—10 Figure 8.

Referring to the drawings in detail, 1 and 2 denote a pair of oppositely disposed vertically extending end frames of appropriate height and width and as shown of polygonal contour. The body of each of said frames is angle-shaped in cross section to form a pair of arms 3, 4 as indicated in Figure 4. Each arm is continuous and the arm 3 is termed the outer arm and the arm 4 the inner arm. Positioned against, as well as secured to the inner face of the arm 3 of the frame 1 is a panel 5 and positioned against and secured to the inner face of the arm 3 of the frame 2 is a panel 6. The panels 5 and 6 completely close the openings formed by the frames 1 and 2 and further the said panels abut against the inner face of the arm 4 of the said end frames.

As shown the lower portions of the arms 3, 4 of each frame extend at opposite inclinations from the center of the frame and the inclination is upward from the center of the frame towards each side, see Figures 2, 3. Mounted upon the upper faces of the lower portions of the arm 4 of the end frames 1 and 2 is a bottom 7 which inclines upwardly from its center towards each side and at the sides thereof is provided with lengthwise extending vertically disposed flanges 8, 9. One end of the bottom 7 abuts against the inner face of the panel 5 at the lower end thereof and the other end of the bottom 7 abuts against the inner face of the panel 6 at the lower end thereof. The bottom 7 at its longitudinal median is provided with a series of spaced openings 10 for a purpose to be presently referred to.

Arranged below the bottom 7 and of a length to extend from one end frame to the other is a supporting base for a sub-frame consisting of a pair of side bars 11, 12 and a pair of end bars 13, 14 of materially less width than the width of the side bars. The bottom edges of the end bars are flush with the bottom edges of the side bars. The side bars abut and are secured to the end frames and the bottom 7. Each side bar is positioned between the center of the bottom 7 and one side thereof. Secured to the bottom of each end frame and to the side bars 11, 12 are oppositely extending inclined brace members 15 and 16 which are disposed at a downward inclination with respect to the end frames and of materially less width than the width of the side bars 11 and 12. The brace members 15 and 16 at their inner ends are secured to the outer faces of the side bars 11 and 12 at the lower portions thereof. The side bar 11, as well as the side bar 12, is formed with a series of spaced notches 17 in the top edge thereof. The notches of one bar are aligned with the notches in the other bar and extending through the aligning notches, as well as being secured to the lower face of the bottom 7, are V-shaped braces 18 which have their end edges flush with the flanges 8 and 9. Extending down through the openings 10, in the bottom 7, and secured to the braces 18 by the hold-fast devices 19, are the lower terminal portions of vertically disposed supporting bars 20 which are of less height than the height of the end frame members 1 and 2. Secured to the bottom 7, intermediate the ends thereof, as well as being secured to the side bars 11 and 12, are oppositely extending inclined brace members 21.

Mounted upon the bottom 7, at each side thereof, as well as centrally thereof, is a vertically disposed support 22 provided at its top and bottom with inwardly extending flanges 23, 24 respectively. The flange 23 seats on the upper face of the bottom 7 and further is secured thereto. The supports 22 abut against the inner faces of the flanges 8 and 9. Mounted upon the flanges 24 of the supports 22 is a V-shaped shelf 25, which extends from the panel 5 to the panel 6, and has secured to its lower face a series of spaced braces 26 corresponding in contour to the shape of the shelf 25, and further secured to the upper ends of the supports 22 by the hold-fast devices 27. The upper ends of the supports are positioned at the center of the brace members 26. The shelf 25 at each side thereof, is formed with a lengthwise extending vertically disposed flange 28.

Mounted upon the bottom 7 at each side of each end thereof and secured to a flange of the bottom 7 and also to the inner face of the arm 4, at each side of an end frame, is a vertically disposed triangular shaped corner piece 29 of appropriate height.

Referring to Figures 7, 8 and 9 of the drawings which illustrate a truck body, in accordance with this invention, of the non-shelf type, 30 and 31 generally indicate a pair of end frames each of polygonal contour. Each of the end frames has the body portion thereof of angle shape in cross section to form an outer arm 32 and an inwardly extending arm 33. The end frames are oppositely disposed with respect to each other and each of the arms thereof is continuous. The top of the arm 33 is formed of a centrally disposed flat portion 34, a pair of oppositely inclined intermediate portions 35 and a pair of flat end portions 36 which merge into the top of the side portions of said arm 33. The top of the arm 32 corresponds in contour to the top of the arm 33. The bottom of the arm 33 is formed with a centrally disposed flat portion 37 of greater length than the length of the flat portion 34 at the top of said arm, and the bottom of said arm 33 is furthermore provided with a pair of oppositely extending inclined portions 38 which merge into the bottom of the side portions of said arm 33. The inclined portions 35 of the top of the arm 33 are downwardly inclined in a direction towards the side portions of said arm and the inclined portions 38 of the bottom of the arm 33 incline upwardly towards the side portions of said arm 33. The bottom of the arm 32 corresponds in contour to the shape of the bottom of the arm 33.

Secured to the bottom of each arm 33, that is to say to the arm 33 of each end frame is a bottom 39 which corresponds in contour to the shape of the bottom portion of each arm 33. That is to say the bottom 39 is formed with a flat central portion and a pair of upwardly inclined end portions and the said flat central portion of the bottom 39, in cross section, is the same length as the length of the flat portion 37 of the bottom of the arm 33. The bottom 39 is provided throughout with a depending flange 40.

The opening formed by each end frame is closed by a panel 41 which is secured to the inner face of the arm 32 of an end frame and further abuts against the inner face of the arm 33 of an end frame. The end frames 30, as well as the end frame 31, at each lower corner thereof, is secured to the bottom 39, by a triangular shaped coupling piece 41' and each of said coupling pieces extends upon the side portions of the arms 33 and the side portions of the flange 40. The coupling pieces 41' are positioned at each corner of the bottom 39.

Positioned below the bottom 39, and extending from the inner face of the flange 40 at each end thereof is a support or sub-frame of rectangular contour formed of a pair of side bars 42, 43 and a pair of end bars 44, 45. The width of the sub-frame or support is materially less than the width of the bottom 39 and further of a width greater than the width of the flat central portion of the bottom 39. Secured to the lower face of the bottom 39 and of a length equal to the width of said bottom is a series of transversely extending brace members 45' which correspond in contour to the cross sectional shape of said bottom and further extend through slits 46 formed in the side bars 42, 43 of the sub-frame or support.

Mounted on the flat central portions 34 of the arms 33 is a display bar 47 of a length to extend from end frame to the other, and which has each end thereof secured to an end member or frame by a strap 48 which overlaps the bar 47 and is secured to the top of an end frame in any suitable manner. Each strap 48 acts as a brace for an end of the bar 47. The bar 47 can be a sign board or carry any display, advertising, or other indicia.

The bodies of the frames 1 and 2 are not necessarily angle shaped; if wood were used they could be of a square rectilinear cross section and have the various other members framed or mortised into them.

End frames 1 and 2 may also be purely rectilinear in shape as well as polygonal.

Panels 5 and 6 are not necessary to the structure, if desired they could be omitted and the end frames 1 and 2 left skeleton.

The lower portions of arms 3 and 4 do not have to extend at opposite inclinations from the center. These inclinations should under some circumstances equal zero. In other words, these racks may be built strictly horizontal or level without any depression toward the center of the body. This, of course, is equally true of the bottom 7.

Openings 10 in bottom 7 are not necessary as the vertical braces 20 may rest on bottom 7 which is in turn supported by the transverse braces 18.

Sub frame side bars 11 and 12 are, in the type of construction I used, channel shaped in cross section and bars 13 and 14 are usually of the same cross section. 13 and 14 are used principally for giving a neat or finished appearance to the body and may be omitted without varying from the holdings of my invention. Also it is not essential that the bottom edges of 13 and 14 be flush with bottom edges of 11 and 12.

Brace members 15 and 16 are not always used. The necessity for using them applies when a side body is desired and the floor 7 overhangs side bars 11 and 12 to such an extent that a load would tend to depress the brace members 18 and warp or distort them if some bracing as 15 and 16 were not used.

Notches 17 are not necessary in side bars 11 and 12. In this instance the preferred construction would call for the use of angle iron or T iron for cross braces 18. Notching out the vertical leg of these braces so the horizontal leg would lie on side bars 11 and 12. Although it might be entirely all right to notch 11 and 12 so the vertical section of 18 would fit into the side bars.

The braces 18 do not have to be V-shaped except where the contour of the bottom is V-shaped. In a flat or concave bottom they would naturally follow the changed contour.

Vertical support 22 does not have to be flanged at each end, if welding be used for attaching it can simply abut against the inner faces of flanges 8 and 9 and be welded there or it may rest on top of flanges 8 and 9 and under flange 28 and be welded in this position.

Also shelf 25 does not have to be V-shaped nor does its contour necessarily have to conform with bottom 7. It can be flat, concave or convex.

The construction of shelf 25 would combine the use of an angle in lieu of 28, extending between each end on each side, braces 26 would consist of angle iron or T iron and floor 25 would be a thin sheet resting on the horizontal legs 28 and on top of braces 26.

It is to be understood that the invention covers the addition of more than one shelf if necessary. This is important as a double shelf will probably prove more popular than either the single floor or single shelf body.

Triangular corner pieces 29 are only necessary in single floor bodies and not always then.

Panel 41 may be omitted from end frames 30 and 31 and these frames used skeleton if desired. Also in this body type as in the shelf type both floor and braces may be flat, concave or convex and not necessarily V-shaped.

Display bar 47 does not have to be as long as the rest of the body. It may be built of any desired length, or, in fact omitted altogether as it is non-essential to the strength of the body.

The shelf or shelves do not necessarily have the same floor contour as does the bottom.

Material other than steel may be used in the application of the invention and I want protection regardless of material used.

The sub frame does not have to be rectilinear. It may be narrow at the front and wide at the back or may be composed entirely of lateral members and without longitudinal members. The sub frame design depends solely on the type chassis it is to be mounted on.

The contour of the floors may be broken, i. e. a fender or mud guard may be built into the lower deck, if width of same brings it beyond the wheels.

In both constructions, when set up from steel, it will be stated that those parts thereof which are secured together, are preferably secured through the means of welding together the said parts.

Either form of truck body disclosed is of such construction that it can be easily loaded and unloaded and will carry its load to the best advantage under all road conditions, then furthermore the arrangement of the floor or bottom of each truck body is such that the load carried thereby will at all times tend to be stationary and further it is such as to prevent side slippage of the load. The form of construction of the truck body, as well as the bracing therefor will permit of the truck body being manufactured with great economy and minimum weight and further will set up a truck body which can be attached to any truck, therefore it is thought the many advantages of a truck body, in accordance with this invention, can be readily understood, and although the preferred embodiment of the invention is as illustrated and described, yet it is to be understood that changes in the details of construction can be had which will fall within the scope of the invention as claimed.

What I claim is:—

1. A truck body comprising a pair of end frames, a bottom or floor secured therewith and including oppositely extending inclined portions, a sub-frame secured to and arranged below said bottom, brace members positioned below and secured to said bottom, a shelf arranged over said bottom and including oppositely extending inclined portions, brace elements for said shelf, and connections between said brace members and said elements.

2. A truck body comprising a pair of end frames, a bottom or floor secured therewith and including oppositely extending inclined portions, a sub-frame secured to and arranged below said bottom, brace members positioned below and secured to said bottom, a shelf arranged over said bottom and including oppositely extending inclined portions, brace elements for said shelf, connections between said brace members and said elements, said sub-frame being rectangular in contour, and said brace members extending through said sub-frame and of a length greater than the width of the latter.

3. A truck body comprising a bottom, an end member secured to each end of the bottom and extending thereabove, a shelf arranged between said end members and spaced above said bottom, bracing elements for said shelf, bracing elements for said bottom and arranged below the same, vertically disposed supports extending through said bottom and connected at their upper ends to said brace elements and at their lower ends to said brace members, and a sub-frame arranged below and extending from one end to the other end of said bottom and further secured thereto, said sub-frame of less width than the width of the bottom, and said bracing members extending through said sub-frame and of a length greater than the width of said sub-frame.

4. A truck body comprising a pair of end frames having inclined portions at the lower ends thereof, means for closing each of said frames, a bottom corresponding in contour to the shape of the lower ends of the frames and extending from one frame to the other, a flat rectangular sub-frame extending from end to end of said bottom, said sub-frame secured to the lower face of and of less width than the width of said bottom, brace members secured to the lower face of the bottom and extending through said sub-frame, and said bottom provided at the sides thereof with a vertical flange.

In testimony whereof, I affix my signature hereto.

SIMEON E. TRAVIS, Jr.